(12) United States Patent
Heuver

(10) Patent No.: US 10,821,819 B2
(45) Date of Patent: Nov. 3, 2020

(54) ELECTRIC MACHINE AND METHOD FOR MANUFACTURE OF AN ELECTRIC MACHINE

(71) Applicant: Ford Global Technologies, LLC, Dearborn, MI (US)

(72) Inventor: Bradley Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 16/261,360

(22) Filed: Jan. 29, 2019

(65) Prior Publication Data
US 2020/0238813 A1 Jul. 30, 2020

(51) Int. Cl.
| | | |
|---|---|---|
| H02K 7/00 | (2006.01) | |
| B60K 6/26 | (2007.10) | |
| H02K 7/108 | (2006.01) | |
| B60K 6/40 | (2007.10) | |
| B60K 6/387 | (2007.10) | |

(52) U.S. Cl.
CPC .............. *B60K 6/26* (2013.01); *B60K 6/387* (2013.01); *B60K 6/40* (2013.01); *H02K 7/006* (2013.01); *H02K 7/108* (2013.01); *B60Y 2200/92* (2013.01); *B60Y 2400/60* (2013.01)

(58) Field of Classification Search
CPC .......... H02K 7/00; H02K 7/003; H02K 7/006; H02K 7/14; H02K 7/17; H02K 7/18; H02K 7/181; H02K 7/1815; B60K 6/00; B60K 6/04; B60K 6/26; B60K 6/36; B60K 6/365; B60K 6/38; B60K 6/387; B60K 6/40; B60K 6/405; B60K 6/48; B60K 6/485; B60K 6/54; B60K 6/547; F16H 45/00; F16H 45/02; F16H 41/00; F16H 41/24; F16D 33/00; F16D 23/00; F16D 23/14; F16D 23/145; F16C 33/00; F16C 33/58; F16C 33/586
See application file for complete search history.

(56) References Cited

U.S. PATENT DOCUMENTS

| | | | |
|---|---|---|---|
| 6,720,696 B2 | 4/2004 | Berhan | |
| 7,509,802 B2 | 3/2009 | Hammond et al. | |
| 9,416,826 B2* | 8/2016 | Frait | B60K 6/405 |
| 2005/0133328 A1* | 6/2005 | Masuya | B60K 6/48 192/3.3 |
| 2006/0289209 A1* | 12/2006 | Grosspietsch | B60K 6/48 180/65.25 |
| 2008/0023287 A1* | 1/2008 | Thiede | B60K 6/48 192/48.1 |
| 2013/0192947 A1* | 8/2013 | Frait | B60K 6/48 192/3.32 |

* cited by examiner

*Primary Examiner* — Tran N Nguyen
(74) *Attorney, Agent, or Firm* — David Kelley; McCoy Russell LLP

(57) ABSTRACT

A driveline system with an electric machine and method for manufacturing driveline system are provide for achieving increased coupling strength between a rotor carrier, rotor drive hub, and a rotor. The driveline system includes the rotor drive hub axially clamped between sections of the rotor carrier and a plurality of laminated rotor sections. The driveline system further includes a torque converter drive plate coupled to the rotor drive hub and a torque converter.

20 Claims, 4 Drawing Sheets

US 10,821,819 B2

ELECTRIC MACHINE AND METHOD FOR MANUFACTURE OF AN ELECTRIC MACHINE

FIELD

The present description relates generally to an electric machine in a driveline system and method for manufacture of an electric machine.

BACKGROUND/SUMMARY

Hybrid vehicles have incorporated electric motors coupled directly to torque converters to allow rotational output from the electric motors to be efficiently introduced into vehicle drivelines. In previous electric motor designs, sections of the rotor in the motor are bolted or riveted directly to a torque converter housing.

One example approach is shown by Hammond et al., in U.S. Pat. No. 7,509,802. Hammond's system uses a bolt to attach a disk member of the rotor assembly to a housing of the torque converter. However, the inventors herein have recognized potential issues with such systems. For instance, bolting the rotor directly to the torque converter housing necessitates a complex manufacturing process. Furthermore, the interface between the torque converter housing and the rotor is formed at an early stage in the electric motor's manufacturing process. For instance, the rotor may be riveted to the torque converter housing, prior to welding of sections of the torque converter housing together. As a result, the cost of motor manufacturing is increased and the adaptability of the manufacturing process is decreased.

In one example, the issues described above may be at least partially addressed by an electric machine. The electric machine comprises a rotor including a plurality of laminated rotor sections, a rotor carrier, a torque converter drive plate coupled to a rotor drive hub, and a torque converter coupled to the torque converter drive plate. The rotor drive hub is axially clamped between the rotor carrier and the plurality of laminated rotor sections. In this way, the rotor is efficiently coupled to the torque converter via clamping engagement. It will also be appreciated that the rotor, rotor drive hub, and the rotor carrier may be clamped up at a late stage in a manufacturing process (e.g., subsequent to welding a torque converter housing), if desired, thereby increasing the adaptability of the machine's manufacturing process.

In one example, a splined interface may be formed between the rotor drive hub and the rotor carrier. In this way, the strength of the attachment between the rotor drive hub and the rotor carrier may be increased. The increased attachment strength may result in a smoother operating and more robust electric machine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-4 are drawn approximately to scale. However, other relative dimensions may be used, in other embodiments.

DETAILED DESCRIPTION

The following description relates to an electric machine with a rotor drive hub clamped between a rotor and a rotor carrier. Interposing the rotor drive hub between the rotor carrier and the rotor allows a robust and simplified connection to be formed between the rotor drive hub and the rotor carrier when compared to electric motors riveting rotors to rotor carriers. Furthermore, the clamping interface in the electric machine may be formed at a later stage in a manufacturing process when compared to previous manufacturing methods, if desired. The adaptability of the manufacturing process is therefore increased while decreasing manufacturing costs of the machine. In one example, a splined interface may be formed between the rotor drive hub and the rotor carrier, further increasing the strength of the interface formed between the hub and the carrier. Thus, the electric machine may be more smoothly operated. It will also be appreciated that the splined interface may simplify the electric machine's manufacturing process when compared to electric motors riveting rotor components directly to the torque converter.

Figure 1:
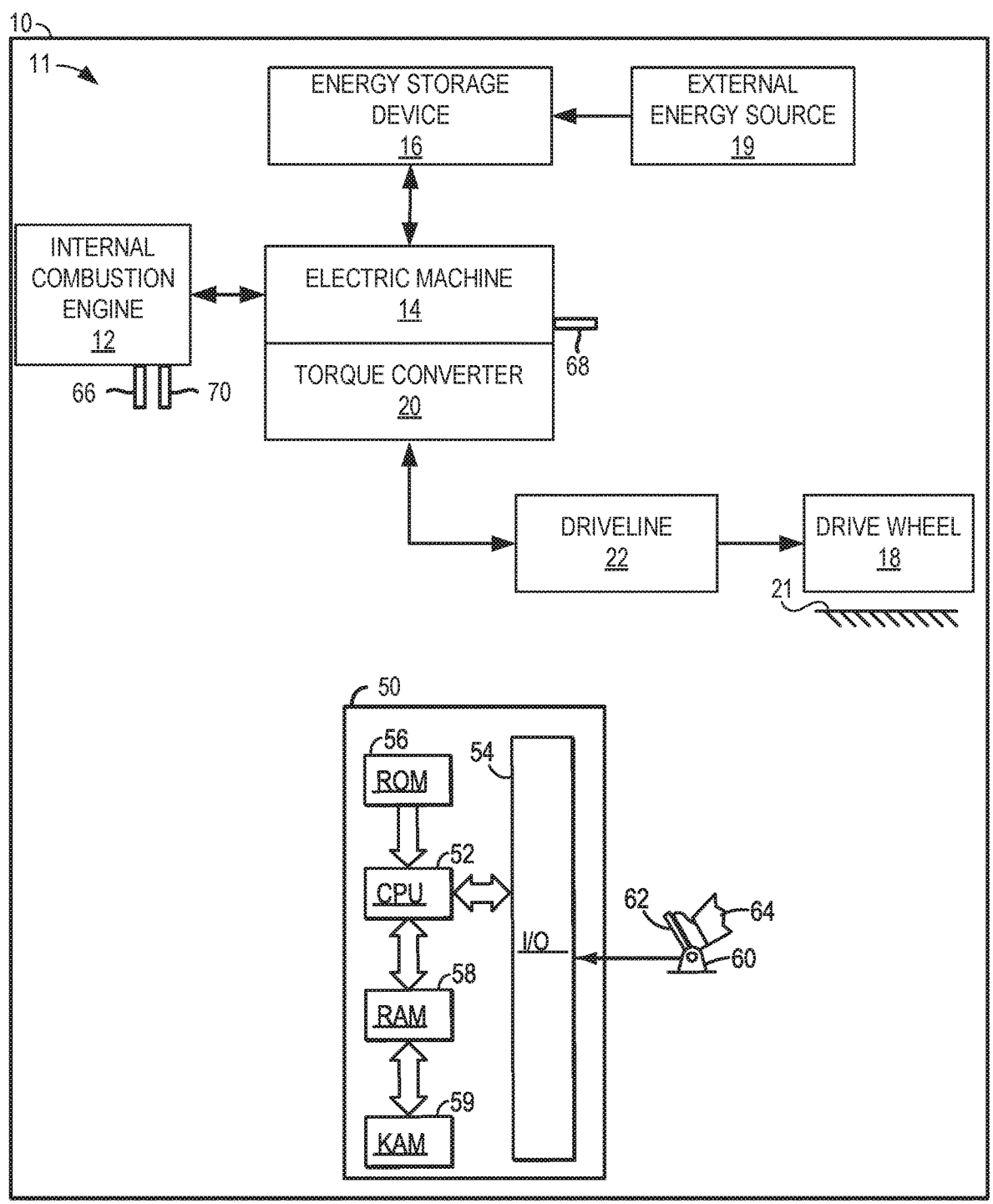
FIG. 1 shows a schematic depiction of a vehicle including an electric machine and internal combustion engine.
Figure 2:
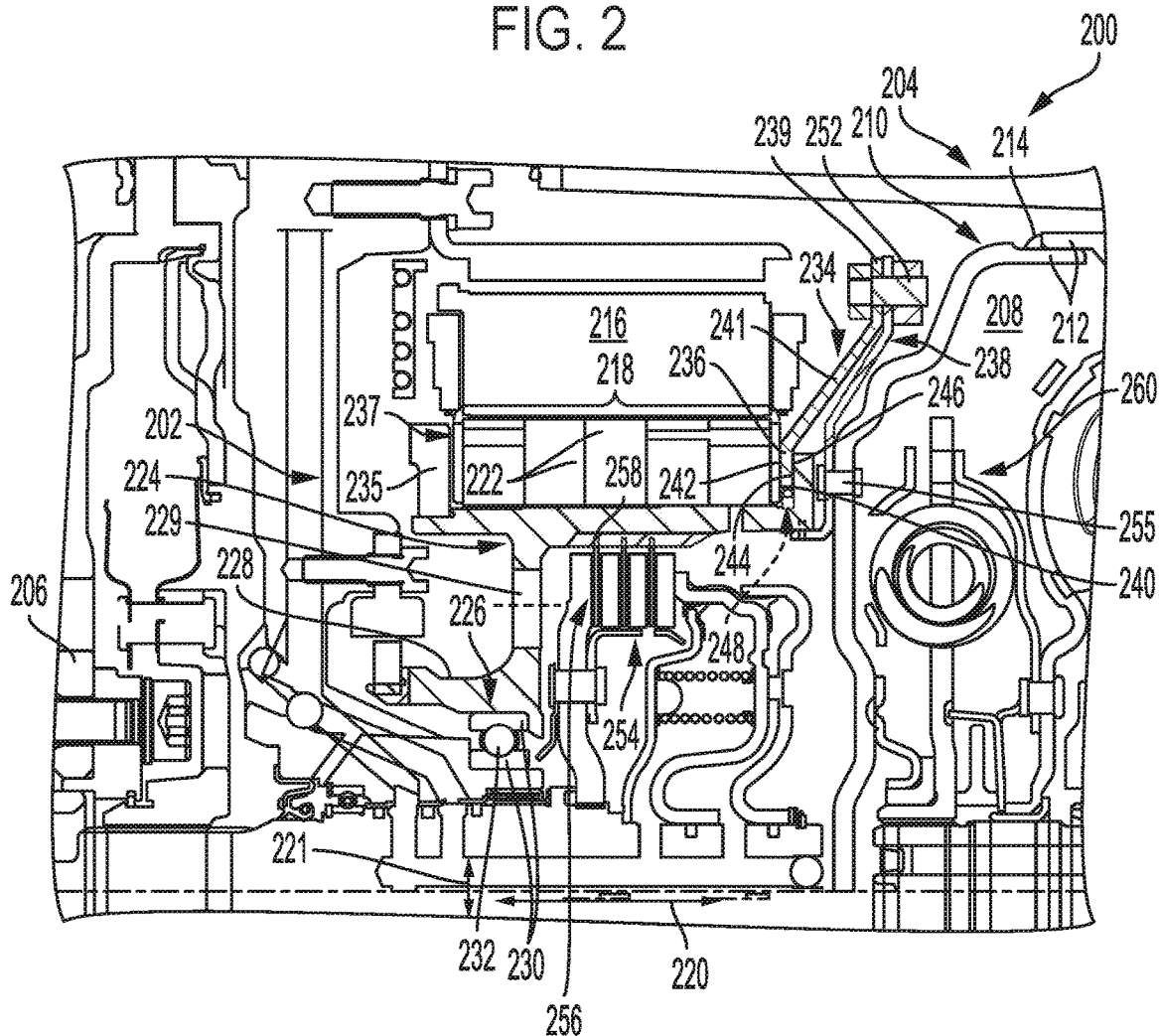
FIG. 2 illustrates an example of the electric machine, shown in FIG. 1.
Figure 3:
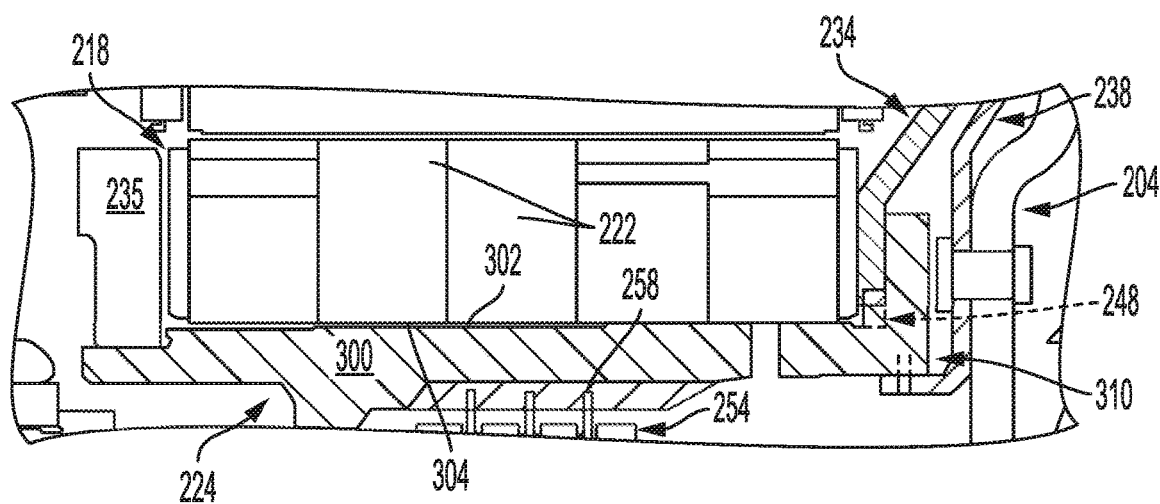
FIG. 3 shows a detailed view of a section of the electric machine, shown in FIG. 2.
Figure 4:
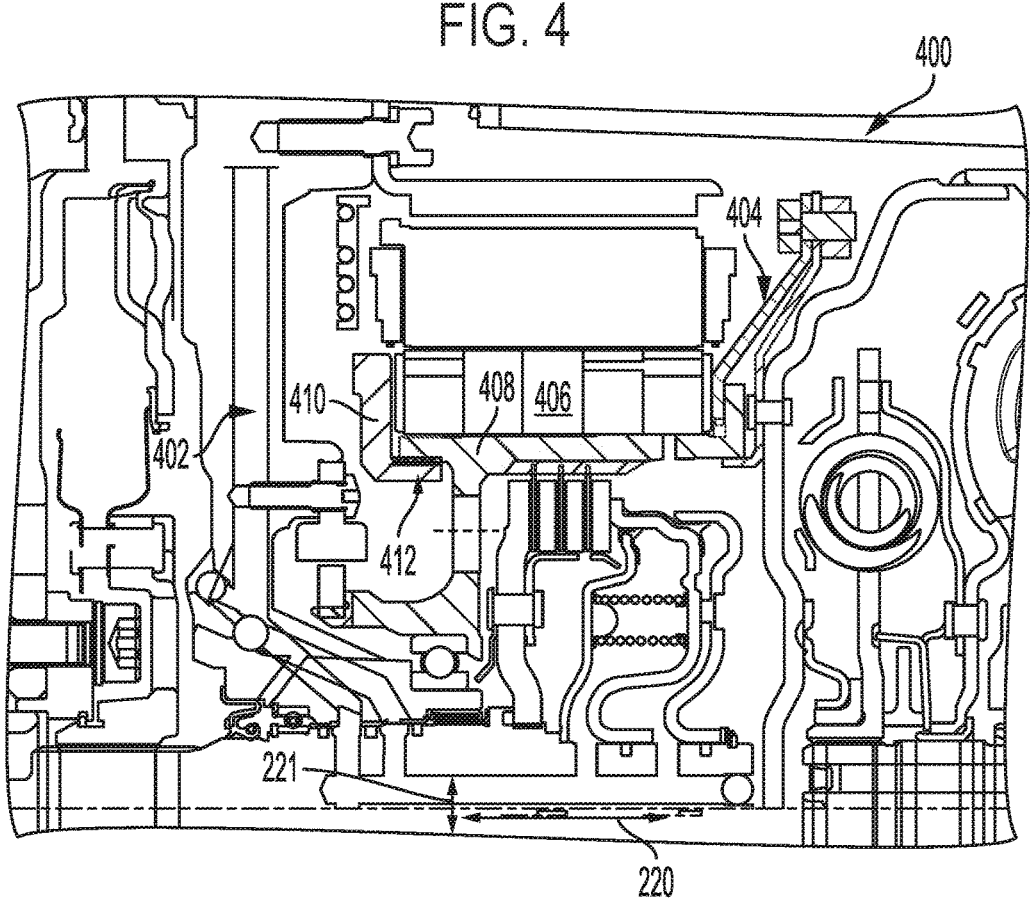
FIG. 4 illustrates another detailed example of the electric machine, shown in FIG. 1.
Figure 5:
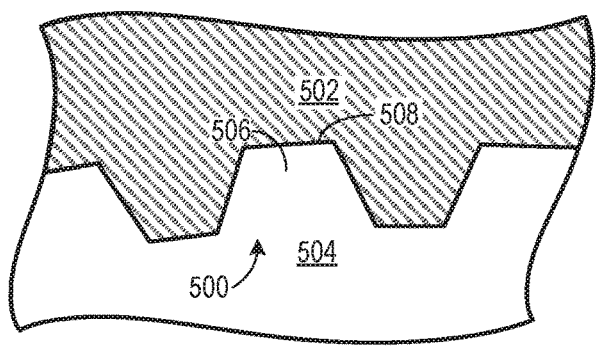
FIG. 5 shows an example of a splined interface that may be included in the electric machines, depicted in FIGS. 2-4.
Figure 6:
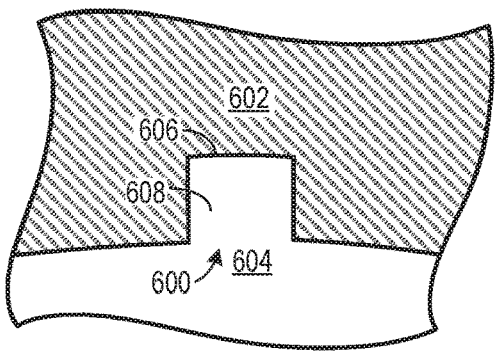
FIG. 6 shows an example of a keyed interface that may be included in the electric machines, depicted in FIGS. 2-4.
Figure 7:
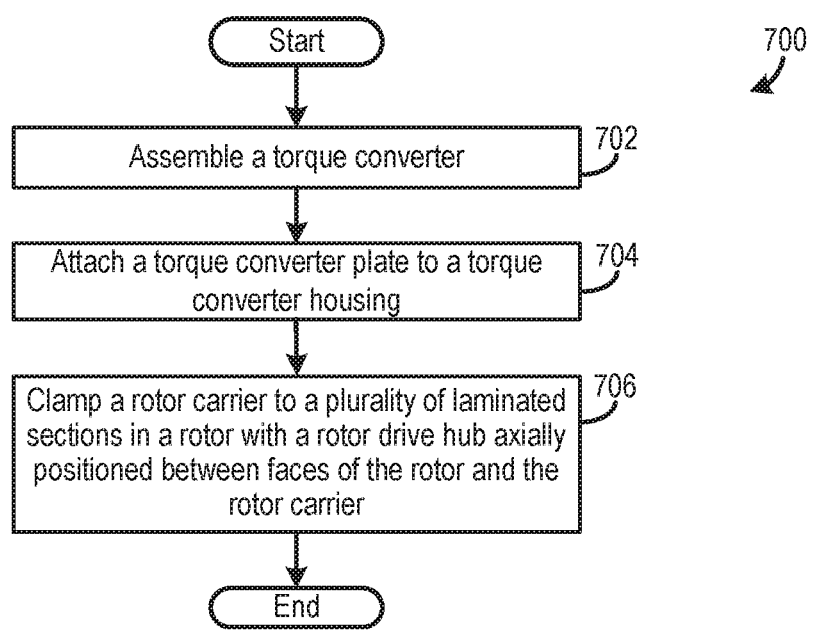
FIG. 7 shows a method for manufacturing an electric machine.

FIG. 1 shows a schematic depiction of a vehicle with a propulsion system having an electric machine. FIG. 2 shows a first embodiment of an electric machine with a torque converter having a rotor drive hub axially interposed between a rotor carrier and a rotor. FIG. 3 shows a detailed view of the clamped section of the electric machine, shown in FIG. 1. FIG. 4 shows a second embodiment of an electric machine with a torque converter axially clamping a rotor drive hub with a rotor carrier and rotor. FIG. 5 shows an example of a splined interface in the embodiments of the electric machine shown in FIGS. 2-4. FIG. 6 shows an example of a keyed interface in the embodiments of the electric machine, shown in FIGS. 2-4. FIG. 7 shows an example of a streamline manufacturing method for an electric machine.

Referring to FIG. 1, the figure schematically depicts a vehicle 10 with a propulsion system 11 (e.g., hybrid propulsion system). Propulsion system 11 includes an internal combustion engine 12. The internal combustion engine 12 is coupled to an electric machine 14 (e.g., energy conversion device).

The electric machine 14 is further shown coupled to an energy storage device 16, which may include a battery, a capacitor, a flywheel, a pressure vessel, etc. The electric machine 14 can be operated to absorb energy from vehicle motion and/or the engine and convert the absorbed energy to an energy form suitable for storage by the energy storage device (e.g., provide a generator operation). The electric machine 14 can also be operated to supply an output (power, work, torque, speed, etc.,) to drive wheels 18 and/or engine 12 (e.g., provide a motor operation). It should be appreciated that the electric machine 14 may, in some embodiments, function only as a motor, only as a generator, or both a motor and generator, among various other components used for providing the appropriate conversion of energy between the energy storage device and the vehicle drive wheels and/or engine. For instance, the electric machine 14 may include a motor, a generator, integrated starter generator, starter alternator, among others and combinations thereof.

The energy storage device 16 may be selectively coupled to an external energy source 19. For example, the energy storage device 16 device may be periodically coupled to a charging station (e.g., commercial or residential charging station), portable energy storage device, etc., to allow the energy storage device 16 to be recharged.

The electric machine 14 is coupled to a torque converter 20. The torque converter 20 is a fluid coupling designed to transfer rotational input from the electric machine 14 and/or the internal combustion engine 12 to a driveline 22. The driveline 22 includes a transmission with gearing and other suitable mechanical components designed to transfer rotational motion to the drive wheels 18. The mechanical components may include a gearbox, axles, transfer cases, etc., for example. The torque converter 20 and the electric machine 14 are depicted as an interconnected unit. However, in other examples, the torque converter and the electric machine may include discrete enclosures.

In one example, a crankshaft of the engine may be coupled to an input of the electric machine and a shaft of the torque converter 20 may be attached to a transmission input. However, other driveline designs have been contemplated.

The depicted connections between engine 12, electric machine 14, driveline 22, and drive wheel 18 indicate transmission of mechanical energy from one component to another, whereas the connections between the electric machine 14 and the energy storage device 16 may indicate transmission of a variety of energy forms such as electrical, mechanical, etc. For example, torque may be transmitted from the electric machine 14 to drive the vehicle drive wheels 18 via the driveline 22. As described above, the electric machine 14 may be configured to operate in a generator mode and/or a motor mode. In a generator mode, system 11 absorbs some or all of the output from engine 12 and/or electric machine 14, which reduces the amount of drive output delivered to the drive wheel 18, or the amount of braking torque to the drive wheel 18. Such operation may be employed, for example, to achieve efficiency gains through regenerative braking, improved engine efficiency, etc. Further, the output received by the electric machine may be used to charge energy storage device 16. In motor mode, the electric machine 14 may supply mechanical output driveline 22, for example by using electrical energy stored in an electric battery. Additionally, the engine 12 may supply rotational output to the driveline 22 during the motor mode, in some instances.

Hybrid propulsion embodiments may include full hybrid systems, in which the vehicle can run on just the engine, just the electric machine (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components, described above with reference to FIG. 1, may be controlled by a vehicle controller 50, described in greater detail herein.

From the above, it should be understood that the exemplary hybrid propulsion system is capable of various modes of operation. In a full hybrid implementation, for example, the propulsion system may operate using electric machine 14 as the only torque source propelling the vehicle. This "electric only" mode of operation may be employed during braking, low speeds, while stopped at traffic lights, etc. In another mode, engine 12 is turned on, and acts as the only torque source powering drive wheel 18 on a drive surface 21. In still another mode, which may be referred to as an "assist" mode, the electric machine 14 may supplement and act in cooperation with the torque provided by engine 12. As indicated above, electric machine 14 may also operate in a generator mode, in which torque is absorbed from engine 12 and/or driveline 22. Furthermore, electric machine 14 may act to augment or absorb torque during transitions of engine 12 between different combustion modes (e.g., during transitions between a spark ignition mode and a compression ignition mode).

FIG. 1 also shows a controller 50 in the vehicle 10. The controller 50 receives signals from the various sensors of FIG. 1 and employs the various actuators of FIG. 1 to adjust vehicle operation based on the received signals and instructions stored in non-transitory memory of the controller. The electric machine, shown in FIGS. 2-6, may also be controlled by the vehicle controller 50. Specifically, controller 50 is shown in FIG. 1 as a conventional microcomputer including: microprocessor unit 52, input/output ports 54, read-only memory 56, random access memory 58, keep alive memory 59, and a conventional data bus. Controller 50 is configured to receive various signals from sensors coupled to the propulsion system 11 and send command signals to actuators in components in the vehicle, such as the electric machine 14. Additionally, the controller 50 is also configured to receive pedal position (PP) from a pedal position sensor 60 coupled to a pedal 62 actuated by an operator 64. Therefore, in one example, the controller 50 may receive a pedal position signal and adjust actuators in the electric machine 14 based the pedal position signal to vary the rotational output of the electric machine 14. It will be appreciated that other components receiving command signals from the controller may function in a similar manner such as the engine 12. The sensors communicating with the controller 50 may include an engine speed sensor 66, electric machine speed sensor 68, and engine temperature sensor 70, etc.

FIG. 2 shows an example of a driveline system 200 including an electric machine 202. It will be appreciated that the electric machine 202 and torque converter 204, shown in FIG. 2, serve as examples of the electric machine 14 and the torque converter 20, shown in FIG. 1.

The electric machine 202 is rotationally coupled to a crankshaft 206 of an engine, such as the engine 12, shown in FIG. 1. The electric machine 202 may transfer rotational energy to a driveline, such as the driveline 22 shown in FIG. 1, during a drive mode. On the other hand, during an energy absorption mode, the electric machine 202 may also receive rotational energy from an engine, such as the engine 12, shown in FIG. 1, and/or a driveline and convert the rotational energy into electric energy.

The torque converter 204 is also shown rotationally coupled to the electric machine 202. The torque converter 204 is configured to transfer rotational energy to downstream components (e.g., the driveline). To achieve the rotational energy transfer functionality the torque converter 204 includes a hydraulic chamber 208 enclosed via a housing 210 and other suitable mechanical components for achieving the rotational energy transfer. The housing 210 is shown including sections 212 that may be welded to one another via a welded interface 214.

The electric machine 202 includes a stator 216 and a rotor 218. The stator 216 electromagnetically interacts with the rotor 218 to provide the previously described rotational energy generation and absorption functionality. Specifically, in a drive mode the stator 216 electromagnetically interacts with the rotor 218 to drive the rotor. A rotational axis 220 of the electric machine 202 is provided in FIG. 2 as well as FIG. 3, for reference. A radial axis 221 of the system is also provided in FIG. 2 as well as FIG. 3, for reference.

In an energy recovery mode the stator 216 electromagnetically interacts with the rotor 218 to generate electrical energy in the stator 216. Thus, the stator 216 may transfer electrical energy to or receive electrical energy from an energy storage device, such as the energy storage device 16, shown in FIG. 1. The stator 216 at least partially circumferentially encloses the rotor 218 in the depicted example. However, other arrangements between the rotor and the stator have been contemplated.

The rotor 218 includes a plurality of laminated rotor sections 222 (e.g., axially laminated rotor sections). The laminated rotor sections 222 of the rotor 218 are clamped to a rotor carrier 224. The laminated rotor sections 222 provide the aforementioned electromagnetic interaction with the stator 216 during operation of the electric machine 202. The rotor carrier 224 functions as a rotational support for the rotor 218. The achieve the rotational functionality, the rotor carrier 224 is coupled to a bearing 226. To elaborate, the rotor carrier 224 includes a support leg 228 coupled to the bearing 226 to facilitate rotation of the rotor carrier, in the illustrated example. The support leg 228 includes a section 229 axially extending towards the rotational axis 220 to facilitate bearing attachment. Specifically, in the illustrated example, the support leg 228 is L-shaped with regard to the cross-sectional view shown in FIG. 2. However, alternate leg contours have been contemplated.

The support leg 228 and the rotor carrier 224 may be formed in one continuous piece, to strengthen the rotor carrier. However, in other examples, the support leg and rotor carrier may be separate components coupled to one another. Additionally, the bearing 226 includes races 230 and roller elements 232 to achieve rotational functionality. The roller elements may be spherical, cylindrical, conical, etc.

A rotor drive hub 234 is shown including a section 236 axially positioned between the laminated rotor sections 222 of the rotor 218 and the rotor carrier 224. A body 241 of the rotor drive hub 234 extends between the hub section 236 and a hub flange 239. The hub flange 239 forms the connection between the rotor drive hub 234 and the torque converter drive plate 238. Therefore, the rotor drive hub 234 is configured to transfer rotational energy from the rotor to the torque converter drive plate 238. In particular, a face 240 (e.g., radial face) of the rotor 218 is in contact with a first axial side 242 of the section 236 of the rotor drive hub 234. A face 244 (e.g., radial face) of the rotor carrier 224 is also in contact with a second axial side 246 of the section 236 of the rotor drive hub 234. The clamping between the rotor 218 and the rotor carrier 224 may be accomplished via an end cap 235 coupled to an axial end 237 of the rotor 218. In one example, the assembly may be coupled together via heating the end cap 235 to an elevated temperature, which causes the inner diameter of the end cap to grow. This essentially reduces, and in some cases substantially eliminates, the press fit between the end cap and the rotor carrier 224.

Continuing with the aforementioned example, after the end cap 235 may be heated the end cap may be assembled and mechanically clamped in place on the rotor carrier 224. Additionally, the clamping force may be held on the end cap 235 until the cap temperature drops below a threshold and the press fit is regained. At that point, the assembly is mechanically clamped via the interference fit between the end cap 235 and the rotor carrier 224. Clamping the rotor to the rotor carrier 224 with the rotor drive hub positioned there between enables a strengthened interface to be formed between these components. Consequently, attachment apparatuses may not be used to attach the rotor to the rotor carrier, in some examples. In this way, manufacturing of the electric machine may be simplified, thereby reducing manufacturing costs. Furthermore, it will be appreciated that clamping the rotor drive hub between the rotor and the rotor carrier can be carried out, if desired, at a stage in manufacturing subsequent to torque converter assembly, thereby increasing the adaptability of the process.

A mechanical interface 248 is formed between the rotor drive hub 234 and the rotor carrier 224, in the illustrated example. The mechanical interface 248 may be a splined interface, a keyed interface, etc. Examples of splined and keyed interfaces are shown in FIGS. 5-6 and described in greater detail herein. However, in other examples, the clamping engagement between the rotor 218 and the rotor carrier 224 may be the only mechanism coupling the rotor 218, rotor drive hub 234, and the rotor carrier 224. In such an example, the clamping force between the rotor 218 and the rotor carrier 224 may provide a targeted clamping force to attach the laminated sections 222 of the rotor 218 to the rotor carrier 224.

In one example, a diametral interference fit may be formed between the drive plate 238 and the rotor carrier 224. Specifically, in one instance, a diametral fit of the interface between an outer diameter (OD) of the drive plate 238, and the inner diameter (ID) of the carrier 224 may serve as a datum for alignment. Consequently, the likelihood of drive plate and carrier misalignment is reduced. It will be appreciated that angular alignment between the drive plate and the carrier may not require a high degree of precision, in some examples. However, in such an example, a high degree of precision may be desired with regard to the alignment between the centerlines of the drive plate and the rotor carrier. Thus, the diametral interference fit between the plate and carrier allows such centerline alignment precision to be achieved, if desired. It will be appreciated that the bolts 239 may not provide a desired degree of centerline alignment, in certain instances.

FIG. 2 also shows a clutch assembly 254 including a clutch plate 256 configured to be rotationally coupled and decoupled the crankshaft 206 from the rotor 218. In one specific example, the clutch assembly 254 may be an internal combustion engine (ICE) disconnect clutch. However, other suitable clutch types have been contemplated. The clutch plate 256 may be engaged with the rotor carrier 224 when in driving engagement. For instance, the clutch plate 256 and the rotor carrier 224 may each include splines 258 mated with one another when the clutch assembly is in driving engagement. However, when the clutch assembly 254 is disengaged, the clutch plate 256 may be uncoupled from the rotor carrier 224. For instance, the splines 258 in the clutch plate 256 and the rotor carrier 224 may be decoupled from one another when the clutch assembly 254 is disengaged. However, other clutch configurations allowing for rotor engagement/disengagement have been envisioned.

A damper assembly 260 is also shown in FIG. 2. The damper assembly 260 is designed to attenuate torque transmitted to the torque clutch in the torque converter 204. For instance, fluid chambers, springs, other suitable mechanical components, etc., may be used to achieve the dampening functionality. However, in other examples, the damper assembly may be omitted from the torque converter.

The torque converter drive plate 238 is shown in FIG. 2 coupled (e.g., fixedly coupled) to the rotor drive hub 234 at the flange 239. Thus, the attachment apparatus 252 (e.g., bolt, rivet, screw, etc.,) extends through the rotor drive hub 234 and the torque converter drive plate 238. In this way, fixed attachment may be formed between the drive plate and the drive hub. The interface between the torque converter drive plate 238 and the rotor drive hub 234 is positioned axially inward, with regard to the torque converter 204, from the interface 248 between the rotor drive hub 234 and the rotor carrier 224, in the illustrated example. Additionally, the interface between the torque converter drive plate 238 and the rotor drive hub 234 is positioned radial outward, with regard to the rotational axis 220, from the interface 248 between the rotor drive hub 234 and the rotor carrier 224, in the illustrated example. In this way, the attachment formed between the rotor drive hub 234 and the torque converter drive plate 238 may be more easily accessed during assembly, repair, etc. As a result, manufacturing and servicing of the electric machine can be further simplified. However, other relative positions of the two interfaces have been envisioned.

The torque converter drive plate 238 is coupled to the housing 210 of the torque converter 204. An attachment apparatus 255 (e.g., bolt, rivet, screw, etc.,) extends (e.g., axially extends) through the torque converter drive plate 238 and the housing 210 of the torque converter 204. Therefore, rotational energy may be transferred from the rotor 218 through the rotor carrier 224, rotor drive hub 234, torque converter drive plate 238, and then to the torque converter 204. The attachment apparatus 255 is positioned radially inward from the attachment apparatus 252 and is spaced away from the rotor carrier 224. In this way, the torque converter drive plate 238 may be attached to the torque converter 204 in a space efficient manner. However, other positions of the attachment interface between the torque converter plate and the torque converter may be used, in other examples.

FIG. 3 shows a detailed view of a portion of the electric machine 202, depicted in FIG. 2. The rotor carrier 224 is shown including a section 300 circumferentially enclosed by the rotor 218 and specifically the laminated sections 222. Additionally, an outer surface 302 of the rotor carrier 224 is in face sharing contact with an outer surface 304 the laminated sections 222 of the rotor 218. In particular, a friction fit may be formed between the rotor carrier and the rotor. In this way, the rotor carrier 224 supports the rotor 218 and rotational movement between the components is substantially prevented. However, other carrier and rotor arrangement have been contemplated, such as non-press fit arrangements.

FIG. 3 again shows the clutch assembly 254 in a driving configuration where the splines 258 in the assembly are engaged with the rotor carrier 224. The end cap 235 coupled to the rotor carrier 224 is also illustrated. The end cap 235 allows a compressive clamping force to be exerted on the rotor drive hub 234 via the rotor carrier 224 and the rotor 218.

FIG. 4 shows another example of a driveline system 400 including an electric machine 402. The electric machine 402, shown in FIG. 4, includes many of the structural and functional features of the electric machine 202 shown in FIG. 2. For instance, the electric machine 402 shown in FIG. 3 again includes a rotor drive hub 404 axially clamped between a rotor 406 with a plurality of laminated sections and a rotor carrier 408. Therefore, redundant description of these common features is omitted for brevity.

The electric machine 402, shown in FIG. 4, is shown including an end cap 410 threadingly engaged with the rotor carrier 408. Specifically, the end cap 410 and the rotor carrier 408 each include threads 412 engaged with one another. The threaded end cap 410 allows the laminated section of the rotor to be clamped to the rotor carrier. Specifically, in one example, the threads on the end cap may replace a press-fit interface. By using a threaded end cap, the higher costs of the assembly equipment for heating the end cap and pressing it into place while hot may be avoided, if desired. As such, a simpler and less costly system of torqueing the cap down can be employed when a threaded end cap is utilized in the electric machine. The end cap 410 (e.g., threaded end cap) is positioned axially outward from the rotor 406. However, other threaded end cap positions have been contemplated.

FIGS. 5 and 6 show examples of the mechanical interface 248 between the rotor drive hub 234 and the rotor carrier 224, shown in FIG. 2. The cross-sectional views are taken along a radial plane of the machine. As such, the viewing direction is aligned with the rotational axis of the machine and extends towards the torque converter 204, shown in FIG. 2.

In particular, FIG. 5 shows an example of a splined interface 500 between a rotor drive hub 502 and a rotor carrier 504. The splined interface 500 includes a plurality of protrusions 506 and recesses 508 mated with one another. It will be appreciated that the protrusions and recesses are included in each of the rotor drive hub 502 and the rotor carrier 504. Thus, the protrusions 506 and the recesses 508 have a complementary shape. It will be appreciated that the splined interface circumferentially extends around the electric machine's rotational axis.

FIG. 6 shows an example of a keyed interface 600 between a rotor drive hub 602 and a rotor carrier 604. The keyed interface 600 includes a keyway 606 and a keyed protrusion 608. In the illustrated example, the keyway 606 is included in the rotor drive hub 602 and the keyed protrusion 608 is included in the rotor carrier 604. However, in other examples, the opposite may be true (i.e., the keyway may be included in the rotor carrier and the keyed protrusion may be included in the rotor drive hub). The keyed protrusion 608 mates with the keyway 606 to form the interface 600. Consequently, a strong and efficiently manufactured connection may be formed between the rotor drive hub and the rotor carrier.

The driveline system and electric machine described with regard to FIGS. 1-6 allow a simple but robust connection to be formed between the rotor carrier and the rotor drive hub. Moreover, the mechanical coupling may be efficiently formed at a later stage in the manufacturing process of the machine to drive down production costs of the electric machine.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 7 shows a method 700 for manufacturing a driveline system. The method 700 may be implemented to manufacture the driveline systems, electric machines, described above with regard to FIGS. 1-6. However, in other examples, the method may be used to manufacture other suitable driveline systems. Instructions for carrying out method 700 may be executed by a controller based on instructions stored on a memory of the controller. Furthermore, it will be appreciated that the method steps may be carried out at least in part via automated tooling apparatuses having a controller. However, at least a portion of the method steps may be manually carried out via manufacturing personnel, in some examples.

At 702 the method includes assembling a torque converter. Assembling the torque converter may include welding housing sections of the torque converter together. Next at 704 the method includes attaching a torque converter plate to a torque converter housing. For instance, an attachment apparatus (e.g., bolt, rivet, etc.,) may be used to form the aforementioned attachment between the torque converter housing and the torque converter plate. In one example, the method may further include, aligning the torque converter drive plate with the rotor drive hub using a diametral interference fit formed between the rotor carrier and the torque converter drive plate. In this way, a desired alignment may be established between the carrier and the drive plate, if desired.

At 706 the method includes clamping a rotor carrier to a plurality of laminated sections in a rotor with a rotor drive hub axially positioned between faces of the rotor and the rotor carrier. Clamping the rotor carrier to the rotor may include, in one example, mating a plurality of splines in the rotor carrier and the rotor drive hub. It will also be appreciated that the end cap may be threaded or otherwise attached to an end of rotor carrier to generate the clamping force. In this way, both clamping and mechanically engaged splines may form the connection between the rotor carrier and the drive hub to increase the strength of the connection. It will also be appreciated that both the steps of clamping and mating splines may be efficiently carried out during manufacturing. Consequently, the manufacturing cost of the electric machine can be decreased.

The technical effect of providing a driveline system with a rotor drive hub axially clamped between a rotor carrier and a rotor is to increase manufacturing efficiency of the driveline system as well as increase the strength of the attachment between the rotor drive hub and the rotor carrier. As a result, production costs of the driveline system along with the likelihood of rotor failure are reduced.

The invention will be further described in the following paragraphs. In one aspect, an electric machine is provided that includes a rotor including a plurality of laminated rotor sections; a rotor carrier; a rotor drive hub axially clamped between the rotor carrier and the plurality of laminated rotor sections; a torque converter drive plate coupled to the rotor drive hub; and a torque converter coupled to the torque converter drive plate.

In another aspect, a method for manufacturing an electric machine is provided that includes subsequent to assembly of a torque converter, clamping a rotor carrier to a plurality of laminated sections in a rotor with a rotor drive hub axially positioned between faces of the rotor and the rotor carrier; where the electric machine includes; a torque converter drive plate coupled to the rotor drive hub; and a torque converter coupled to the torque converter drive plate. In one example, the method may further comprise aligning the torque converter drive plate with the rotor drive hub using a diametral interference fit formed between the rotor carrier and the torque converter drive plate.

In any of the aspects or combinations of the aspects, assembly of the torque converter may include welding sections of a torque converter housing to one another.

In any of the aspects or combinations of the aspects, clamping the rotor carrier to the plurality of laminated sections may include mating a plurality of splines in the rotor carrier and the rotor drive hub.

In any of the aspects or combinations of the aspects, the electric machine may further comprise a splined interface formed between the rotor drive hub and the rotor carrier.

In any of the aspects or combinations of the aspects, the splined interface may include a plurality of mated protrusions and recesses included in each of the rotor drive hub and the rotor carrier.

In any of the aspects or combinations of the aspects, the torque converter drive plate may be fastened to the rotor drive hub at a position radially outward from the splined interface.

In any of the aspects or combinations of the aspects, the electric machine may further include a keyed interface formed between the rotor drive hub and the rotor carrier, where the keyed interface includes a keyway mated with a keyed protrusion.

In any of the aspects or combinations of the aspects, the electric machine may further include an end cap threaded onto a first end of the rotor carrier and spaced away from a second end of the rotor carrier coupled to the rotor drive hub.

In any of the aspects or combinations of the aspects, the rotor carrier may form a continuous shape and includes a support leg coupled to a rotor bearing.

In any of the aspects or combinations of the aspects, the torque converter may be coupled to a driveline.

In any of the aspects or combinations of the aspects, the driveline system may further include a splined interface formed between the rotor drive hub and the rotor carrier, where the splined interface includes a plurality of mated protrusions and recesses included in each of the rotor drive hub and the rotor carrier.

In any of the aspects or combinations of the aspects, the driveline system may further include an end cap threaded onto a first end of the rotor carrier and spaced away from a second end of the rotor carrier coupled to the rotor drive hub.

In any of the aspects or combinations of the aspects, the torque converter may be rotationally coupled to a drive wheel.

In any of the aspects or combinations of the aspects, the electric machine may be selectively rotationally coupled to an internal combustion engine and/or a torque converter.

In any of the aspects or combinations of the aspects, the torque converter drive plate and the rotor drive hub may be attached via a diametral interference fit.

In another representation, an electric machine is provided that includes an axially clamping interface formed between laminated rotor sections, a rotor drive hub, and a rotor carrier coupled to a rotor bearing, where the rotor drive hub is attached to a torque converter via a torque converter drive plate.

In yet another representation, an electric machine is provided that includes an axially clamped assembly with rotor laminations positioned on a first axial side of a rotor drive hub and a rotor carrier flange positioned on a second axial side of the rotor drive hub opposing the first axial side, where the clamping assembly substantially prevents relative movement between rotor, the rotor carrier, and the rotor drive hub.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine comprising:
   a rotor including a plurality of laminated rotor sections;
   a rotor carrier;
   a rotor drive hub axially clamped between the rotor carrier and the plurality of laminated rotor sections;
   a torque converter drive plate coupled to the rotor drive hub; and
   a torque converter coupled to the torque converter drive plate.

2. The electric machine of claim 1, further comprising a splined interface formed between the rotor drive hub and the rotor carrier.

3. The electric machine of claim 2, where the splined interface includes a plurality of mated protrusions and recesses included in each of the rotor drive hub and the rotor carrier.

4. The electric machine of claim 2, where the torque converter drive plate is fastened to the rotor drive hub at a position radially outward from the splined interface.

5. The electric machine of claim 1, further comprising a keyed interface formed between the rotor drive hub and the rotor carrier, where the keyed interface includes a keyway mated with a keyed protrusion.

6. The electric machine of claim 1, where the torque converter drive plate and the rotor drive hub are attached via a diametral interference fit.

7. The electric machine of claim 1, where the electric machine is selectively rotationally coupled to an internal combustion engine and/or a torque converter.

8. The electric machine of claim 1, further comprising an end cap threaded onto a first end of the rotor carrier and spaced away from a second end of the rotor carrier coupled to the rotor drive hub.

9. The electric machine of claim 1, where the rotor carrier forms a continuous shape and includes a support leg coupled to a rotor bearing.

10. The electric machine of claim 1, where the torque converter is coupled to a driveline.

11. A method for manufacturing an electric machine, comprising:
    subsequent to assembly of a torque converter, clamping a rotor carrier to a plurality of laminated sections in a rotor with a rotor drive hub axially positioned between faces of the rotor and the rotor carrier;
    where the electric machine includes;
    a torque converter drive plate coupled to the rotor drive hub; and
    a torque converter coupled to the torque converter drive plate.

12. The method of claim 11, where assembly of the torque converter includes welding sections of a torque converter housing to one another.

13. The method of claim 11, further comprising aligning the torque converter drive plate with the rotor drive hub using a diametral interference fit formed between the rotor carrier and the torque converter drive plate.

14. The method of claim 11, where clamping the rotor carrier to the plurality of laminated sections includes mating a plurality of splines in the rotor carrier and the rotor drive hub.

15. A driveline system in a hybrid vehicle comprising:
an electric machine including:
    a rotor a plurality of laminated rotor sections;
    a rotor carrier; and
    a rotor drive hub clamped between axial faces of the rotor carrier and the plurality of laminated rotor sections;
a torque converter drive plate coupled to the rotor drive hub via an attachment apparatus; and
a torque converter coupled to the torque converter drive plate.

16. The driveline system of claim 15, further comprising a splined interface formed between the rotor drive hub and the rotor carrier, where the splined interface includes a plurality of mated protrusions and recesses included in each of the rotor drive hub and the rotor carrier.

17. The driveline system of claim 15, where the torque converter drive plate and the rotor drive hub are attached via a diametral interference fit.

18. The driveline system of claim 15, further comprising an end cap threaded onto a first end of the rotor carrier and spaced away from a second end of the rotor carrier coupled to the rotor drive hub.

19. The driveline system of claim 18, where the rotor carrier forms a continuous shape and includes a support leg coupled to a rotor bearing.

20. The driveline system of claim 15, where the torque converter is rotationally coupled to a drive wheel.

* * * * *